Nov. 10, 1953     C. W. OLIPHANT     2,658,578
SEISMIC PROSPECTING
Filed Oct. 5, 1948     3 Sheets-Sheet 1
FIG. 1
PARTICLE MOTION IN LONGITUDINAL WAVE
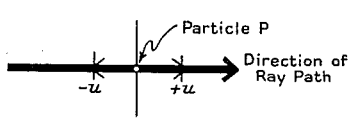
FIG. 2
PARTICLE MOTION IN TRANSVERSE WAVES OF THE SV AND SH TYPES
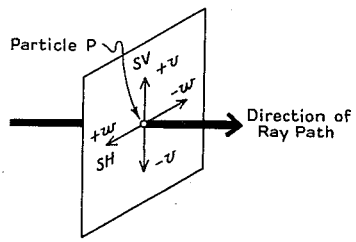
FIG. 3
GUIDE TO RECORD CHARACTER
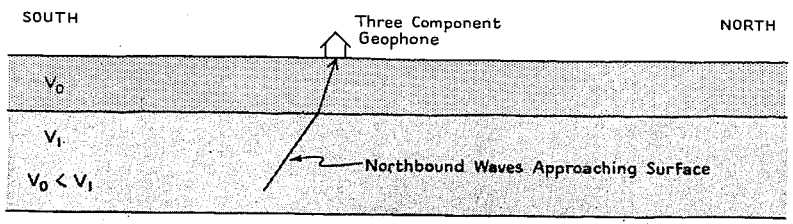
RECORD CHARACTER FOR LONGITUDINAL PULSE
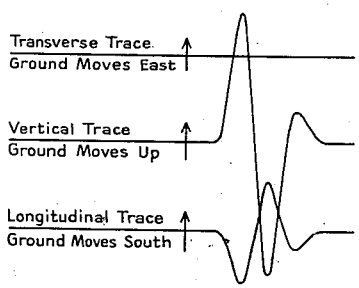
FIG. 4
RECORD CHARACTER FOR TRANSVERSE PULSE OF THE SV TYPE
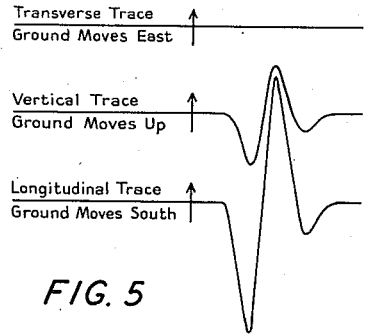
FIG. 5
INVENTOR
CHARLES W. OLIPHANT
BY Beale and Jones
ATTORNEYS Nov. 10, 1953         C. W. OLIPHANT         2,658,578
                     SEISMIC PROSPECTING
Filed Oct. 5, 1948                        3 Sheets-Sheet 3

INVENTOR
CHARLES W. OLIPHANT
BY Beale and Jones
ATTORNEYS

Patented Nov. 10, 1953

2,658,578

UNITED STATES PATENT OFFICE 2,658,578

SEISMIC PROSPECTING

Charles W. Oliphant, Tulsa, Okla.

Application October 5, 1948, Serial No. 52,858

3 Claims. (Cl. 181—.5)

The present invention is concerned with seismic prospecting, and, particularly, with methods of ascertaining the constitution and geometry of earth substrata by means of both longitudinal and transverse elastic body waves.

In general, the seismic refraction and reflection techniques, presently available in the field of exploration geophysics, rely on longitudinal elastic body waves. Such waves are generated by the detonation of a small charge of explosive in a shallow hole, and are known as direct waves because their origin is in the vicinity of the exploding charge.

In marked contrast, few attempts have been made to utilize transverse elastic body waves for seismic prospecting. Generally, the present practice is to ignore or, in fact, take steps to prevent the generation or recording of these waves.

The few cases attempting to utilize transverse elastic body waves, have relied largely on the generation of these waves, not at the shot point, but at some remote subsurface discontinuity where incident longitudinal waves are reflected and refracted, and, in this process, loose some small fraction of their energy to the generation of transverse waves; such waves are known as transformed waves because their origin is due to a secondary process in some region remote from the exploding charge. To obtain useful geologic information, in this instance, an atempt is made first to identify the subsurface region in which the transverse waves were generated and, second, to trace out the shortest-time paths subsequently followed by these transformed waves.

From field studies in this connection, I have verified the fact that useful geologic information can be obtained from an analysis of the traveltimes of transformed transverse elastic body waves. Generally, however, the usefulness of the method is restricted to those areas where the geologic and seismic conditions are exceedingly simple. In areas of even slight complication, considerable uncertainty will exist as to the region of generation and subsequent shortest-time transmission path. Furthermore, it was found that the discontinuity in elastic parameters of earth substrata often does not favor the transformation to significant quantities of transverse wave energy; in this case the method fails because small quantities of transformed transverse energy are confused or obliterated by extraneous ground unrest.

My invention thus is not primarily concerned with transformed transverse elastic body waves. On the contrary, my invention is directed toward the methods of utilizing both direct longitudinal and direct transverse elastic body waves, generated in the immediate vicinity of an exploding charge in order to ascertain the constitution and geometry of earth substrata. In the discussion below it will be shown first: that sound theoretical considerations predict the generation of both of these wave types at the shot, and second: that practical field methods and observations substantiate the theory. The result is a new and useful improvement in the method of seismic prospecting.

The present invention may be more readily understood from the following explanation and description of the accompanying drawings.

In Figure 1, the particle motion relative to a horizontal ray path is shown for plane longitudinal waves. The particle is displaced in a direction parallel to the ray path.

In Figure 2, the particle motion relative to a horizontal ray path is shown for plane transverse waves of the SV and SH type. The particle in Figure 2 is displaced along some preferred line, in the plane perpendicular to the ray path.

In Figure 3 is a representation of earth substrata possessing different velocity character with a northbound wave from a detonation at a position south of the geophone approaching a three component geophone, representative of such geophones positioned at appropriately spaced receiving points. The orientation conditions of Figure 3 were chosen to fit the orientation conditions of the actual records for a three component seismograph shown in Figure 7 and enlarged in Figure 6.

In Figure 4 there is illustrated an example of the record character to be expected from plane longitudinal waves. The direction of wave travel, wave path, and geophone orientation were chosen to fit the field conditions of the actual field records shown in Figures 6 and 7.

In Figure 5 there is illustrated an example of the record character to be expected from transverse waves of the SV type. The direction of wave travel, wave path, and geophone orientation were chosen to fit the field conditions of the actual field records shown in Figures 6 and 7.

Figure 6:
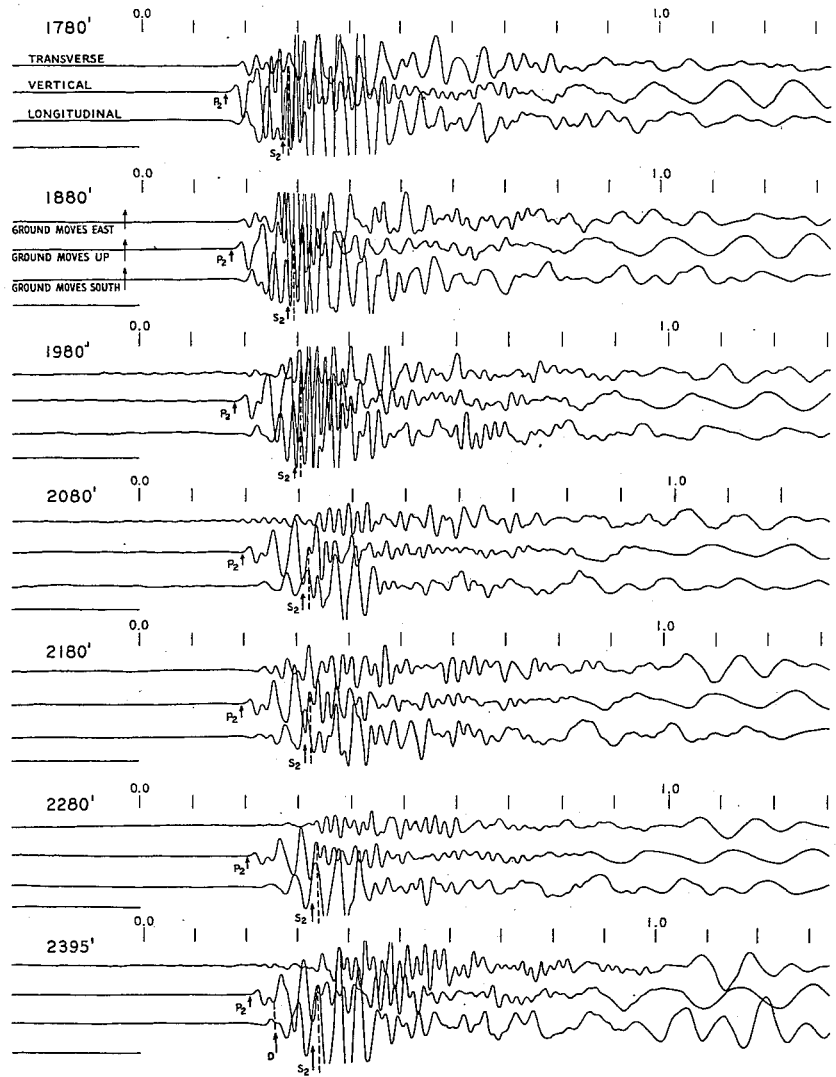
Figure 6 is an enlarged view of the lefthand portion of Figure 7.

For the purposes of a theoretical discussion, attention is directed to a homogeneous elastic solid body in which plane waves are to be generated by an arbitrary disturbance; by a plane wave it is meant that the displacement, velocity or acceleration which the wave imparts to some very small volume unit or particle of the material at any instant depends only on the time and distance from a fixed plane. Establishing, then, a coordinate system in which the axis of X is perpendicular to this fixed plane and the axes of Y and Z are in it, and taking the respective displacement components parallel to these axes as $u$, $v$, and $w$, the equations of motion become:

$$(\lambda+\mu)\left(\frac{\partial}{\partial x}, \frac{\partial}{\partial y}, \frac{\partial}{\partial z}\right)\theta + \mu \nabla^2(u,v,w) = \rho \frac{\partial^2}{\partial t^2}(u,v,w) \quad (1)$$

where:

$\lambda$ and $\mu$ = the elastic constants of the material $$\theta = \frac{\partial u}{\partial x} + \frac{\partial v}{\partial y} + \frac{\partial w}{\partial z}$$

$\rho$ = the density of the material $t$ = time

A solution may be obtained by differentiating the three equations of (1) which, on consideration of the plane wave front, gives first for the equations of motion in the $x$ direction:

$$(\lambda+2\mu)\frac{\partial^2 w}{\partial x^2} = \rho \frac{\partial^2 w}{\partial t^2} \quad (2)$$

$$\mu \frac{\partial^2 v}{\partial x^2} = \rho \frac{\partial^2 v}{\partial t^2} \quad (3)$$

$$\mu \frac{\partial^2 w}{\partial x^2} = \rho \frac{\partial^2 w}{\partial t^2} \quad (4)$$

Then if we take:

$$V_P = \sqrt{\frac{\lambda+2\mu}{\rho}} \quad (5)$$

$$V_S = \sqrt{\frac{\mu}{\rho}} \quad (6)$$

the general solution of Equations 2, 3 and 4 are:

$$u = f(x - V_P t) + f'(x + V_P t) \quad (7)$$

$$v = f(x - V_S t) + f'(x + V_S t) \quad (8)$$

$$w = f(x - V_S t) + f'(x + V_S t) \quad (9)$$

where $f$ and $f'$ may be any functions whatever.

Thus Equation 7 states, among other things, that displacement components of the original disturbance parallel to the X axis will travel in the $x$ direction with a velocity $V_P$; in contrast, Equations 8 and 9 state that displacements perpendicular to the X axis will travel in the $x$ direction with a velocity $V_S$. Evidently, then, the arbitrary disturbances generates two wave types which travel with different velocity.

For the wave type represented by Equation 7 $v$ and $w$ are zero and any small volume unit of the disturbed material experiences compression which changes its volume but not its shape; these waves are known as direct longitudinal, compressional, dilational, or primary waves.

For the wave type represented by Equations 8 and 9 $u$ is zero and any small volume unit of the disturbed material experiences a change in shape but not volume; these waves are known as direct transverse, shear, or secondary waves. In the case of these transverse waves the further distinction may be made that when both $u$ and $w$ are zero, Equation 8 represents a vertically polarized transverse wave, known as an SV wave; a horizontally polarized, SH wave, would correspond to the case where both $u$ and $v$ were zero.

These results are illustrated in Figures 1 and 2, where particle displacements, relative to the same ray path, are shown for each of the wave type predicted by Equations 7, 8 and 9. In the instance of a plane longitudinal wave the particle is displaced in a direction parallel to the ray path; for transverse waves the particle is displaced along some preferred line in the plane perpendicular to the ray path. The transverse wave may be termed SV or SH when the preferred line or direction of polarization is respectively vertical or horizontal.

In case the wave fronts are spherical, there would be no change in the particle motion of the longitudinal wave; the displacements in the transverse wave, however, would follow the curvature of the wave front and produce a rotational motion. The magnitude of such rotations would be exceedingly small, in cases of practical interest; evidently then, this second order rotational effect is ill-suited for the purpose of receiving and recording transverse elastic body waves.

Thus, in summary, it has been shown from theoretical considerations that an arbitrary disturbance in a homogeneous elastic solid initiates longitudinal elastic body waves which travel with the velocity $$V_P = \sqrt{\frac{\lambda+2\mu}{\rho}}$$

and, in addition, transverse elastic body waves which travel with the velocity $$V_S = \sqrt{\frac{\mu}{\rho}}$$

The particle motion excited by the passage of these two wave types is decidedly different, and this latter fact is the proper criterion for distinguishing one from the other.

Now, in comparing the theoretical predictions with actual field observations, I have found that the detonation of a small dynamite charge in a shallow, cylindrical hole will generate direct longitudinal elastic body waves as well as direct transverse elastic body waves of the SV type. The energy of the latter wave is comparable to the more frequently used and better known longitudinal wave. SH type waves have also been observed, but there is evidence that they did not originate at the shot point.

These observations infer that the generating motion of the source is not completely arbitrary. The pressure from the exploding charge acts radially on the walls of the cylindrical hole to produce a compression and thus initiate the direct longitudinal elastic body waves. The expanding gases of the detonated charge also produce a compression at the base of the cylindrical hole, but since this compressional stress is acting at right angles to the compressional stress directed radially to the walls of the cylindrical hole and since, in general, the stresses will not be of equal magnitude in all directions, a zone of shearing strain exists about the edges of the circular base of the cylindrical hole. Apparently, then, the asymmetry of the stress distribution favors the generation of direct SV type transverse elastic body waves.

By utilizing the direct transverse elastic body waves as well as the direct longitudinal elastic body waves generated in the immediate vicinity of the shot point, significant improvements are effected in the methods for investigating the constitution and geometry of earth substrata. The method comprises the generation of these wave types; the reception, at a series of appropriately spaced points, of the three principal components of ground motion which these waves produce; the recording of this motion and the shot instant as a function of time; and the analysis of recorded data for wave type, wave path and wave velocity.

The details of the method may be clarified by a discussion of the various necessary steps. First, in receiving, at a series of appropriately spaced points, the ground motion produced by longitudinal and transverse elastic body waves, it is imperative that the motion of a particle, disturbed by the passage of these waves, be completely described as a function of time. Complete description of the particle motion is only obtained when the three principal or mutually perpendicular components of its displacement, velocity or acceleration are measured, at a particular point; this is accomplished by a three component seismometer, for example, one consisting of three inertia-mass and spring systems arranged to respond only to motions in the three mutually perpendicular directions, corresponding to the principal axes X, Y and Z of the previous theoretical discussion. A single three component seismometer is required for the reception of ground motion at each point.

For a wave proceeding in the $x$ direction, received and recorded particle motion when parallel to the $x$ direction is known as longitudinal motion; when parallel to the $y$ direction, vertical motion; and when parallel to the $z$ direction transverse motion. It will be shown that a longitudinal elastic body wave proceeding in the $x$ direction, can produce components of particle motion in the $x$ and $y$ directions, and that the same is true of an SV type transverse wave. In this case, an SH type transverse wave would produce motion only in the $z$ direction. The discussion below will describe, in detail, the method by which plane longitudinal and plane SV type transverse elastic body waves are identified on three component seismograph records.

When wave paths are short and when transverse and longitudinal waves arrive almost simultaneously, the resultant ground motion is exceedingly complex; the confused character of the records makes it impractical to attempt a distinction between the two wave types on the basis of particle motion. At greater spread distances, the situation is more favorable because transverse waves, traveling with a velocity considerably lower than the longitudinal waves, arrive at a later time. The distinctive motion inherent in each wave type is then adequate for identifying longitudinal and transverse elastic body waves. This motion is most easily understood by examining the particle displacement of each wave type relative to the same ray path.

Referring to Figures 4 and 5, a hypothetical pulse of pure longitudinal motion and pure transverse motion of the SV type are applied to the conditions shown in the other figures. The traces shown in Figures 4 and 5 show the expected record character. In a more realistic case, the motion of the two pulses would be recorded on one record and separated by a time interval governed by path distance and the ratio of longitudinal and transverse velocities.

Two important facts should be evident from a comparison of these hypothetical records:

The largest motion for a steeply emergent longitudinal pulse is on the vertical trace whereas the largest motion for a steeply emergent SV pulse is on the longitudinal trace.

The directions of trace displacement are opposite for the longitudinal pulse (where a vertical trace peak occurs simultaneously with a longitudinal trace trough) whereas the directions of trace displacement are the same for the SV pulse (where a vertical trace trough occurs simultaneously with a longitudinal trace trough).

The latter characteristic was found to be the most useful. It should be noted that a change in the conditions of the example produces changes in the expected record character; for instance, if all conditions remained the same except that the waves were southbound, the longitudinal pulse would produce a vertical trace peak simultaneously with a longitudinal trace peak whereas a trough and peak would coincide for the SV pulse.

Figure 7:
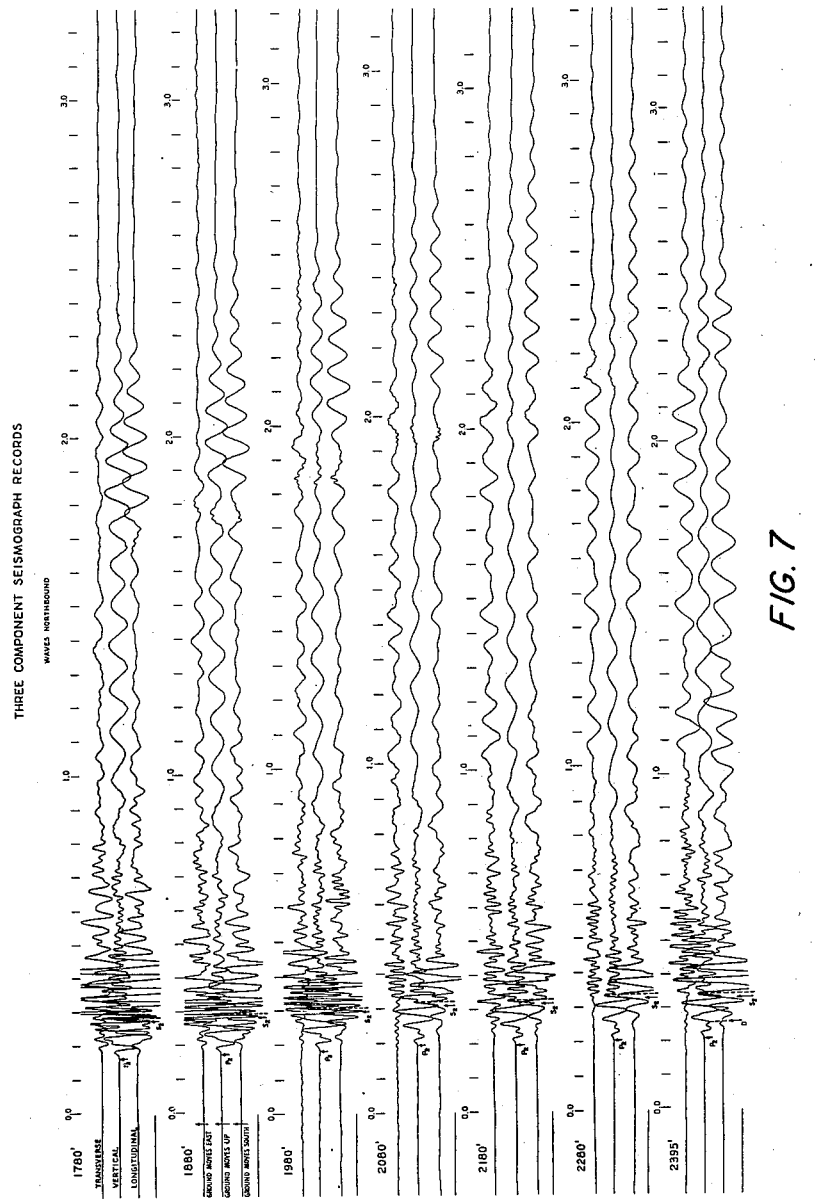
Figure 7 is a record of actual seismograms obtained in the field by detonating a small charge of dynamite in a shallow cylindrical hole, receiving, by means of three component seismometers at appropriately spaced points, the three components of ground motion so produced, and the recording of these motions and the shot instant as a function of time.

Attention is now directed to the seismograms of Figure 7 and the enlargement of its initial parts, Figure 6. These seismograms were obtained in the field by detonating a small charge of dynamite in a shallow cylindrical hole, receiving, by means of three component seismometers at appropriately spaced points, the three principal components of ground motion so produced, and the recording of these motions and the shot instant as a function of time. Since the seismometers were north of the seismic disturbance or shot point, see Figure 3, the recorded waves are termed northbound and correspond to waves traveling in the positive $x$ direction; the horizontal distance from shot point to seismometer was varied from 1780 feet to 2395 feet at approximately 100 foot intervals; the top trace of each seismogram records transverse motion parallel to the $z$ direction with upward trace displacement corresponding to eastward ground movement; the second trace records vertical motion parallel to the $y$ direction with upward trace displacement corresponding to upward ground motion; the third trace records longitudinal motion parallel to the $x$ direction with upward trace displacement corresponding to southward ground motion; the fourth trace records the shot instant. Small vertical lines above each seismogram mark elapsed time after the shot instant in intervals of 0.1 second.

Figure 6 is an enlargement of the ground motions recorded on Figure 7 in the time interval between the shot instant and 1.0 second later.

Figures 6 and 7, particularly the enlargement shown in Figure 6, may now be compared with the representations in Figures 4 and 5 since the orientation conditions of each are identical. From this comparison it will be seen that the vertical and longitudinal traces of the actual field seismograms exhibit particle motions attributable to both longitudinal and SV type transverse waves. As expected, the field records do not achieve the idealized simplicity of Figures 4 and 5. The approach is sufficiently close, however, that the identification principle is applicable, and accordingly, on any one seismogram, a particular longitudinal wave has been marked as $P_2$ and the corresponding SV type transverse wave as $S_2$, see the reference vertical broken line. Other longitudinal and transverse waves are also recorded at different arrival times, and could be similarly identified; point D, for example, on the seismogram at 2395 feet is another longitudinal wave with a different and longer travel path than that of P₂.

Thus, wave types may be identified. It has been shown that longitudinal and transverse waves may be distinguished and identified when the three principal components of ground motion which they produce are received by a three component seismometer and recorded, as a function of time, at appropriately spaced points. In contrast, it should be quite clear that although a single component seismometer is capable of receiving both longitudinal and transverse type waves, the observation of but a single component of ground motion is insufficient evidence for distinguishing the two wave types.

The remaining steps in the method comprise the identification of the path followed by both of these wave types and the determination of their propagation velocities.

To identify the shortest time path traversed by a particular type of wave it is necessary to observe the time of arrival of the wave at a series of properly spaced points. This data is sufficient to construct a travel-time graph which, when properly analyzed, will define the subsurface wave path; from this graph propagation velocities may also be obtained.

The theory and practice of travel-time graph construction and interpretation has been well established in prior operations of the art of seismic prospecting. My invention differs from the previous practices, however, in that travel-time graphs are constructed and interpreted for both the direct longitudinal elastic body waves and the direct transverse elastic body waves generated in the immediate vicinity of an exploding charge in a shallow cylindrical hole. Other differences will become apparent from further discussion.

I have found, for example, that the travel-time for both longitudinal and SV type transverse elastic body waves, when traced to shorter and shorter distance intervals between shot and recording points, must pass through the origin of the travel time graph; that is to say, the travel time for these two waves decreases with decreasing travel distance in such a way as to become zero at zero separation distance of shot and seismometer. It has thus been verified experimentally that these wave types originate at the shot point. In the subsequent identification of wave paths, considerable benefit derives from this known origin of both wave types, and much of the uncertainty inherent in the analysis of transformed wave paths is eliminated.

For purposes of illustration, and for these purposes alone, it is useful to review the properties of a travel time graph. If the arrival time of a particular event recorded on a seismogram at varying distances from the shot point is plotted on a graph whose abscissa is distance and whose ordinate is time, a travel-time line is defined. The properties of this line identify the wave path.

If the line is straight the transmitting medium has a constant velocity and the wave has traveled directly from shot to seismometer or has been refracted at some subsurface discontinuity with a vertical depth dependent on the time intercept at zero distance. A curved travel-time line, concave upwards (towards increasing values of time), must be that of a reflected wave, while a curved line, concave downwards (toward decreasing values of time) is indicative of a direct wave undergoing continuous refraction by a medium whose velocity increases continuously with depth. A broken, but continuous, travel-time line is indicative of a refracted wave path through layers with a discontinuous increase of velocity or in rare instances of faulting. A truly discontinuous travel-time line is indicative of a wave path involving a low velocity layer between two high velocity layers.

The slope of the travel-time line is the reciprocal of the velocity with which the event traveled in the body of the material, and the time intercept of the line at zero distance, sometimes known as the total delay time, is indicative of the depth at which the wave was reflected or refracted.

In the construction of travel-time graphs for the purpose of identifying wave paths it should be clearly understood first that: the arrival time of a significant event on the seismogram at one particular separation distance of shot and seismometer must be correlated with the arrival time of the same significant event at a different separation distance, and second that: if the event plotted on the travel-time graph does not represent the true first arrival of energy over some path, then the path will be erroneously identified. These considerations are perfectly general and apply equally to seismic refraction or reflection techniques.

In prior operations of the art these two requirements have limited the usefulness of the seismic method. In refraction techniques, for example, the conventional single component seismometer, that is an inertia-mass and spring system responsive to motion in only one of the three principal directions, seldom produces seismograms in which events other than the first recorded motion can be correlated at different separation distances of shot and seismometer. In reflection techniques, also utilizing single component seismometers, it is usually true that the recorded reflection events which can be correlated from one separation distance to another do not represent the true first arrival of energy over the permissible reflection paths.

With a three component seismometer, that is a single base plate to which is secured three inertia-mass and spring systems each responsive to motions in only one of the three principal directions, I have found that the above limitations can more frequently be overcome. The recorded combination of three mutually perpendicular components of ground motion greatly increases the opportunities for correlating the same ground motion event at different separation distances of shot and seismometer, and, in addition, frequently permits the determination of the true beginning of a particular event. In the geologic and seismic field conditions where these operations are feasible, the absolute rather than the relative depth of several refracting or reflecting horizons may be obtained. Thus, by the methods of my invention, travel time graphs may be constructed for both the direct longitudinal elastic body waves and the direct transverse elastic body waves which have been generated by an exploding charge in a shallow cylindrical hole. Because the information plotted on such a graph is obtained from three component seismograms rather than the conventional single component seismogram it is more frequently possible to correlate the same ground motion event and to determine the true beginning at each of the different separation distances of shot and seismometer.

The combination of the above techniques, then, results in a new and useful improvement in the seismic method of ascertaining the geometry of earth substrata. It remains to be shown that the same observational data, obtained by the above methods, when combined with an independent observation of bulk density, determine two of the elastic parameters of the transmitting material; these are sufficient to specify its constitution.

From the constants of the differential Equation 2 it was seen that the propagation velocity of longitudinal waves was given by Equation 5:

$$V_P = \sqrt{\frac{\lambda + 2\mu}{\rho}} \qquad (5a)$$

and from Equations 3 and 4 the propagation velocity of transverse waves was given by Equation 6:

$$V_S = \sqrt{\frac{\mu}{\rho}} \qquad (6a)$$

Now, as previously discussed, the slope of the travel-time line is the reciprocal of the transmission velocity for the particular event or wave type under consideration. Thus, when similar wave paths have been traversed, in the same material, by both longitudinal and transverse elastic body waves and when the bulk density of that material is independently known, the elastic parameters $\lambda$ and $\mu$ of the material may be calculated. Additionally, it will be clear that other elastic parameters such as Young's modulus, Poisson's ratio, compressibility, etc., may also be calculated when $V_P$, $V_S$, and $\rho$ are known.

It should be pointed out that the above calculations rely on the assumption that the material in question is uniformly homogeneous and isotropic. In this regard, I have found that substrata, in general, do not achieve these idealized conditions. For this and other reasons, then, the constitution of earth substrata deduced in this manner is not sharply diagnostic. Major sedimentary and igneous rock or substratum types can usually be distinguished, as for example, a shale from a limestone or a granite from a gabbro, but the transitional lithologies, intermediate between the major types must remain uncertain.

In using this method to ascertain the constitution of earth substrata, significant advantages accrue from use of the direct longitudinal elastic body wave and the direct transverse elastic body wave. Since both waves originate in the immediate vicinity of the shot point, the respective shortest-time wave paths, either direct, reflected or refracted, between shot or seism disturbance location and seismometer may be conveniently deduced from travel-time graphs. In this connection, I have found that direct or refracted wave paths, generally, are the most useful ones for ascertaining the constitution of earth substrata, since with direct or refracted wave paths the respective propagation velocities for both wave types are determined by a single stratum or layer. When reflected wave paths, and particularly when transformed reflected wave paths are involved, the propagation velocities for both wave types are determined not by a single stratum or layer but by all of the strata or layers intervening between the shot or disturbance point and the reflecting discontinuity; elastic parameters for reflected wave paths will thus have values influenced by the thickness of each different stratum or layer of the reflection path. In most geological circumstances the elastic parameters from a reflection wave path are useless for diagnosing the constitution of the material.

From the specification, it is apparent that my invention has wide application in the determination of the physical properties of the earth's strata and that it is not limited to the particular type of equipment or arrangement of equipment referred to in this specification.

I claim as my invention:

1. A method for the investigation of earth substrata which comprises establishing a single disturbance point in the area to be investigated, creating a seismic single disturbance at the disturbance point which includes the generation of longitudinal and transverse body waves, establishing a reception point for seismic waves at each of a plurality of spaced points removed from the single disturbance point but sufficiently close to the single disturbance point to receive energy from said disturbance point, and receiving at each reception point and recording as a function of time as separate indicia on a record the three principal and mutually perpendicular components of translational ground motion which said waves produce, together with the instant of their generation, said indicia completely describing the movements of each reception point in space as a function of time and said indicia being different in phase and amplitude for said longitudinal and said transverse body waves and serving to distinguish and identify them.

2. A method according to claim 1 wherein said reception of the three principal and mutually perpendicular components of ground motion are received and recorded as a function of time so as to produce a seismogram showing the difference in phase, amplitude and frequency of waves impressed on the reception point, and by the difference in phase, amplitude and frequency distinguishing these waves and their arrival time.

3. A method according to claim 1 including the determination of the bulk density of said earth substrata, using said recordings of the ground motions for a determination of the propagation velocities of said longitudinal and transverse elastic body waves proceeding along similar transmission paths in said earth substrata, and using said bulk density and said determined propagation velocities to measure the elastic parameters of said earth substrata.

CHARLES W. OLIPHANT.

References Cited in the file of this patent

UNITED STATES PATENTS

| Number | Name | Date |
|---|---|---|
| 2,046,104 | Blau | June 30, 1936 |
| 2,216,452 | Owen | Oct. 1, 1940 |
| 2,354,548 | Ricker | July 25, 1944 |
| 2,390,187 | Rogers | Dec. 4, 1945 |
| 2,482,233 | Arringdale | Sept. 20, 1949 |
| 2,555,806 | Mitchell, Jr. | June 5, 1951 |
| 2,576,775 | Case | Nov. 27, 1951 |